United States Patent
Kamen et al.

(10) Patent No.: US 6,456,287 B1
(45) Date of Patent: Sep. 24, 2002

(54) METHOD AND APPARATUS FOR 3D MODEL CREATION BASED ON 2D IMAGES

(75) Inventors: Yakov Kamen, Cupertino; Leon A. Shirman, Redwood City, both of CA (US)

(73) Assignee: ISURFTV, Sunnyvale, CA (US)

( * ) Notice: Subject to any disclaimer, the term of this patent is extended or adjusted under 35 U.S.C. 154(b) by 0 days.

(21) Appl. No.: 09/361,470

(22) Filed: Jul. 27, 1999

Related U.S. Application Data

(60) Provisional application No. 60/118,508, filed on Feb. 3, 1999.

(51) Int. Cl.[7] ............................................. G06T 15/20
(52) U.S. Cl. .................. 345/427; 345/581; 345/582; 348/832; 382/154; 382/293; 382/285
(58) Field of Search ................................ 345/425, 430, 345/427, 581, 582; 348/832; 382/154, 285, 293

(56) References Cited

U.S. PATENT DOCUMENTS

| | | | | |
|---|---|---|---|---|
| 4,490,745 A | * | 12/1984 | Erickson et al. | 348/832 |
| 5,175,806 A | * | 12/1992 | Muskovitz | 345/425 |
| 5,255,352 A | * | 10/1993 | Falk | |
| 5,566,285 A | * | 10/1996 | Okada | 345/430 |
| 5,712,999 A | * | 1/1998 | Guttag et al. | 345/421 |
| 5,745,667 A | * | 4/1998 | Kawase et al. | 345/430 |
| 5,838,331 A | * | 11/1998 | DeBry | 345/430 |

OTHER PUBLICATIONS

Foley et al. "Computer Graphics: Principles and Practice", published Jul. 1997, chapters 3 and 14, pp. 132–140, pp. 617–645.*

* cited by examiner

*Primary Examiner*—Mark Zimmerman
*Assistant Examiner*—Kimbinh T. Nguyen

(57) ABSTRACT

A method in accordance with the invention comprises the step of providing a) pixel array and a computer model of a geometric surface, and b) providing a second array (a Z array) containing information concerning the 3D characteristics of the structure depicted in the pixel array. The Z array is used to modify the location of the geometric surface. The pixel array and modified geometric surface are then used to render an image that can be displayed on a CRT or other output device. By modifying the geometric surface model in this way, it is possible to create more realistic images.

5 Claims, 6 Drawing Sheets

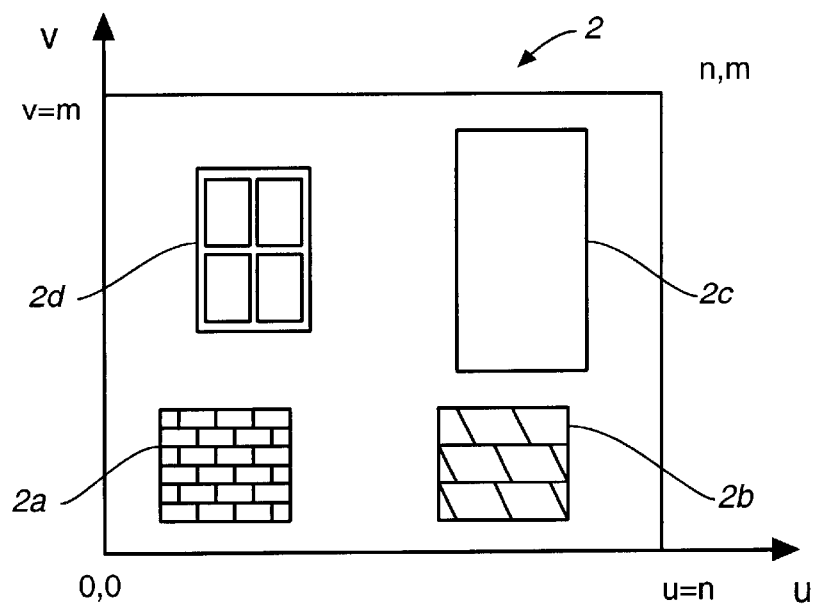
FIG._1A
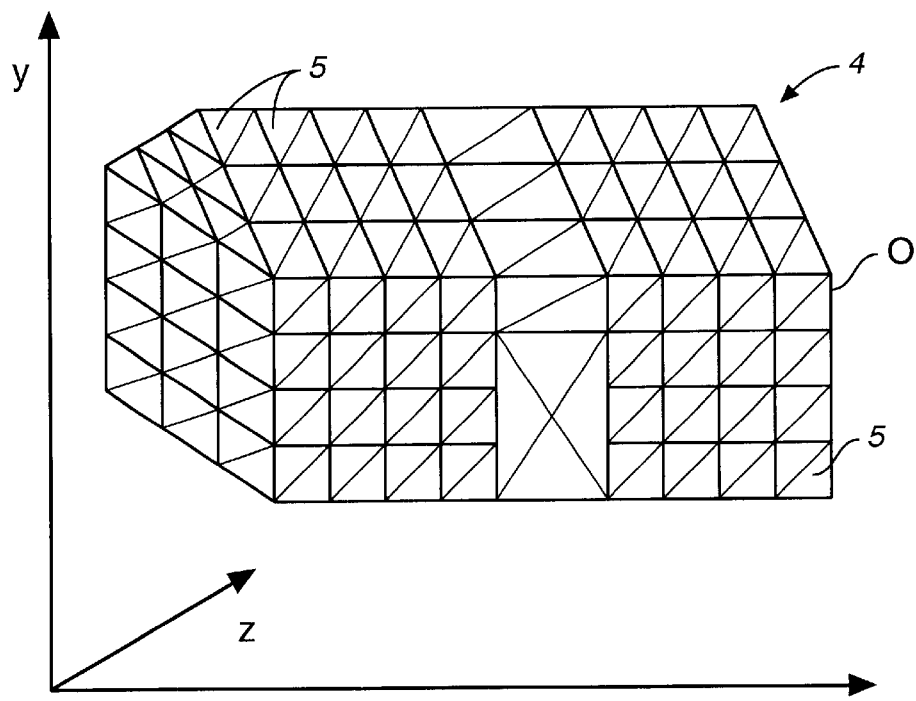
FIG._1B

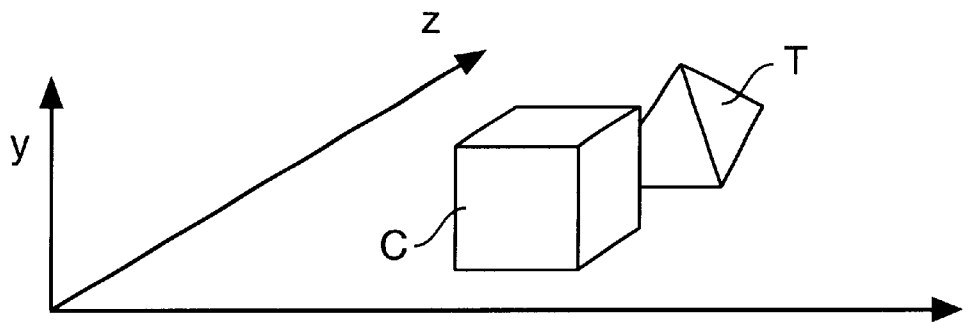
FIG._1C
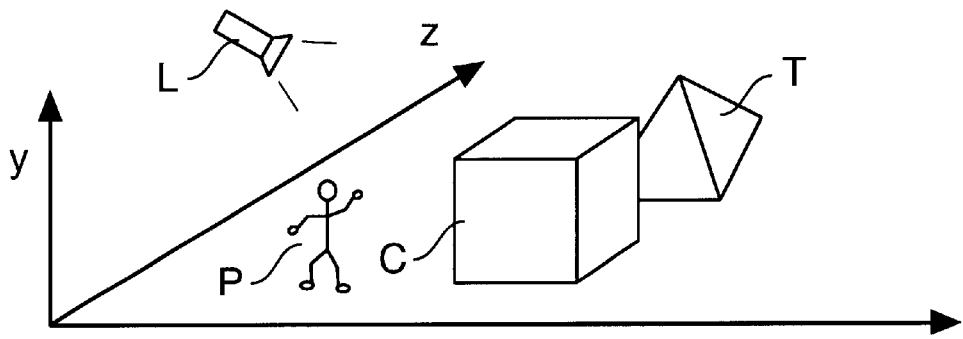
FIG._1D
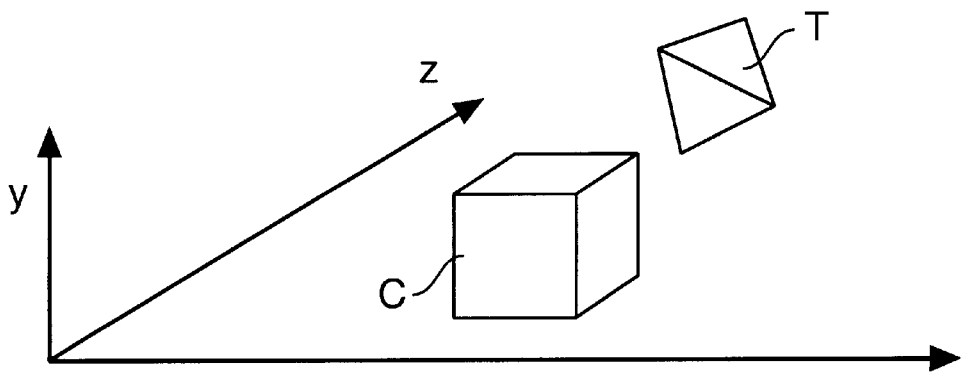
FIG._1E

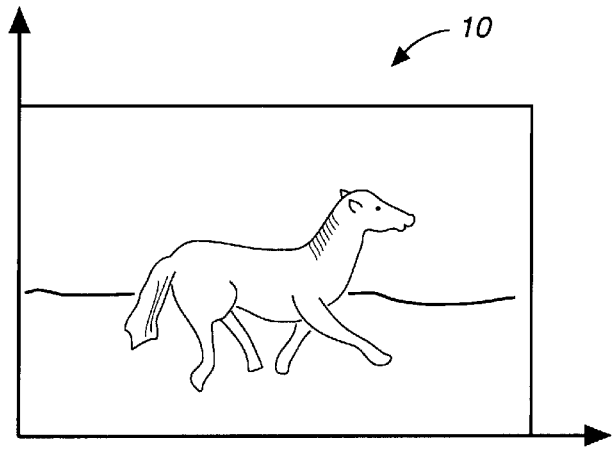
FIG._2A
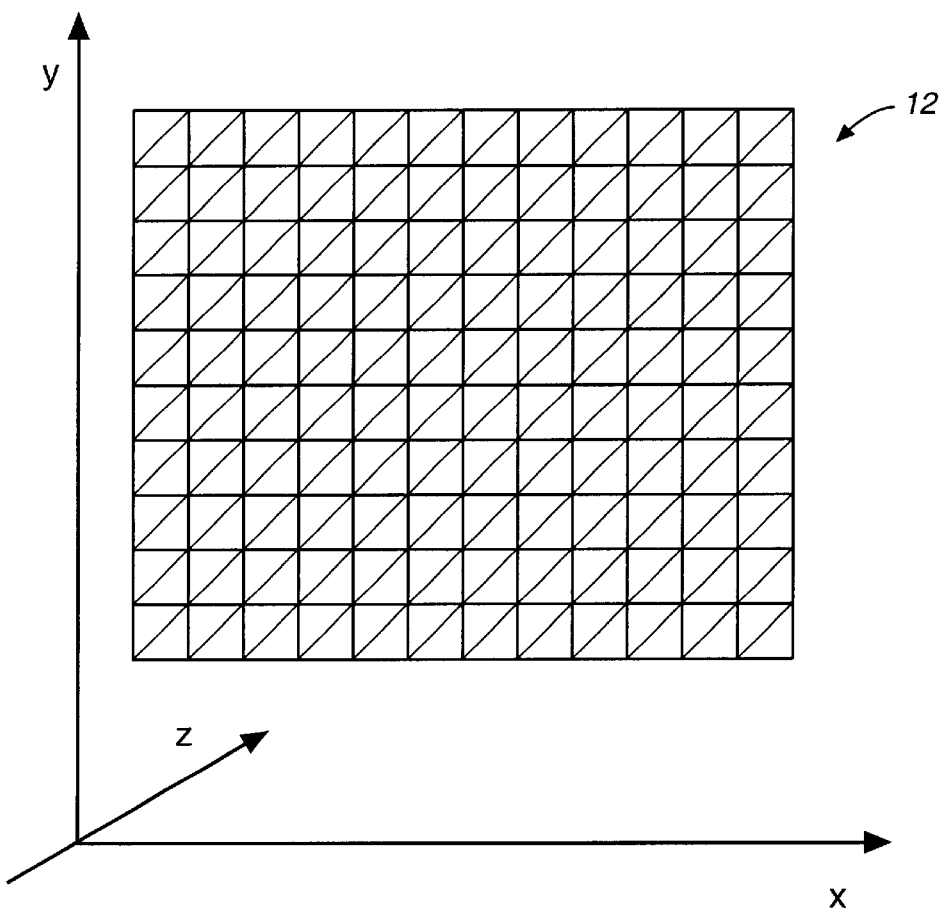
FIG._2B

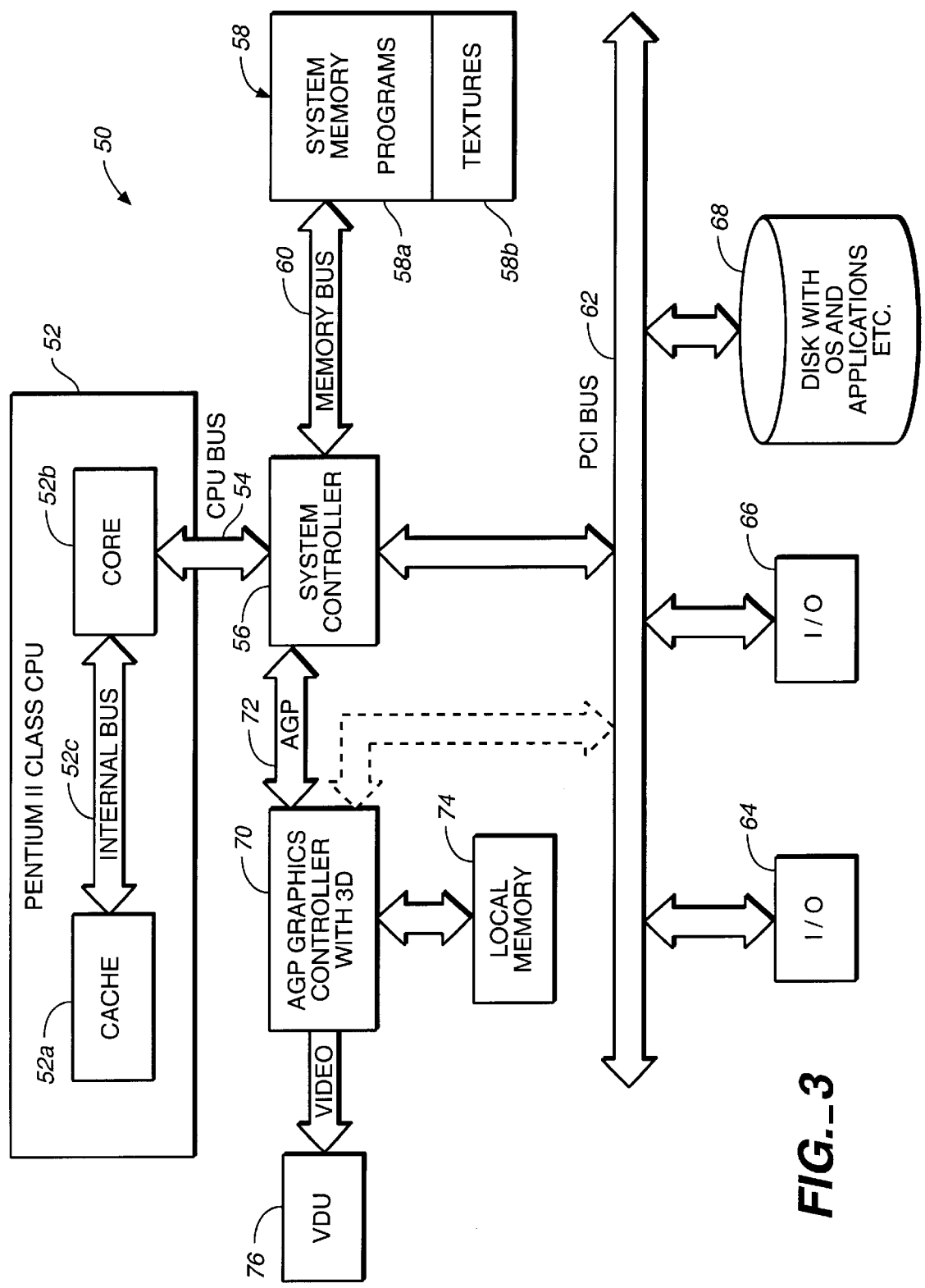
FIG._3

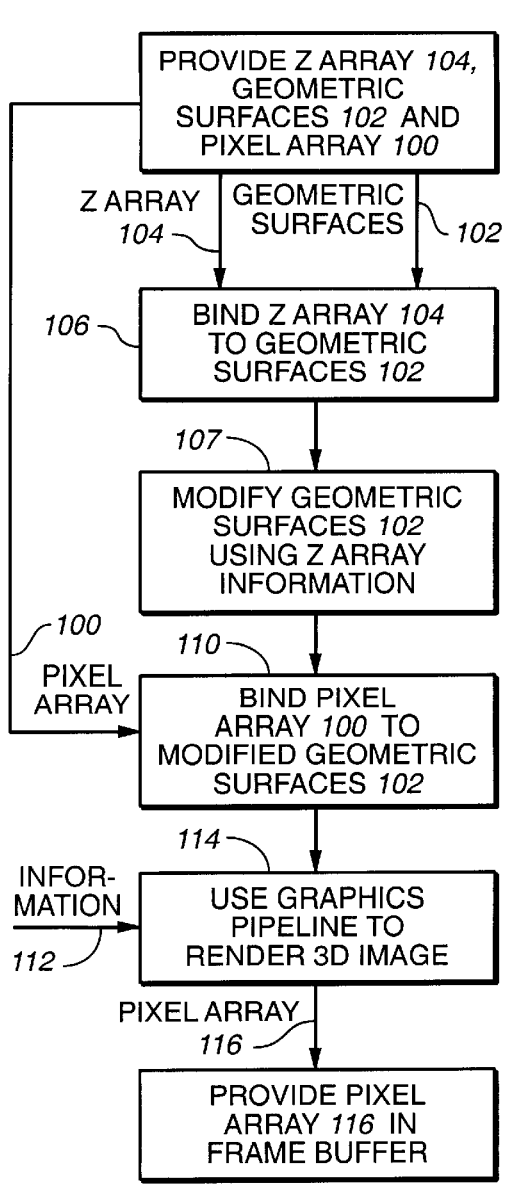
FIG._4
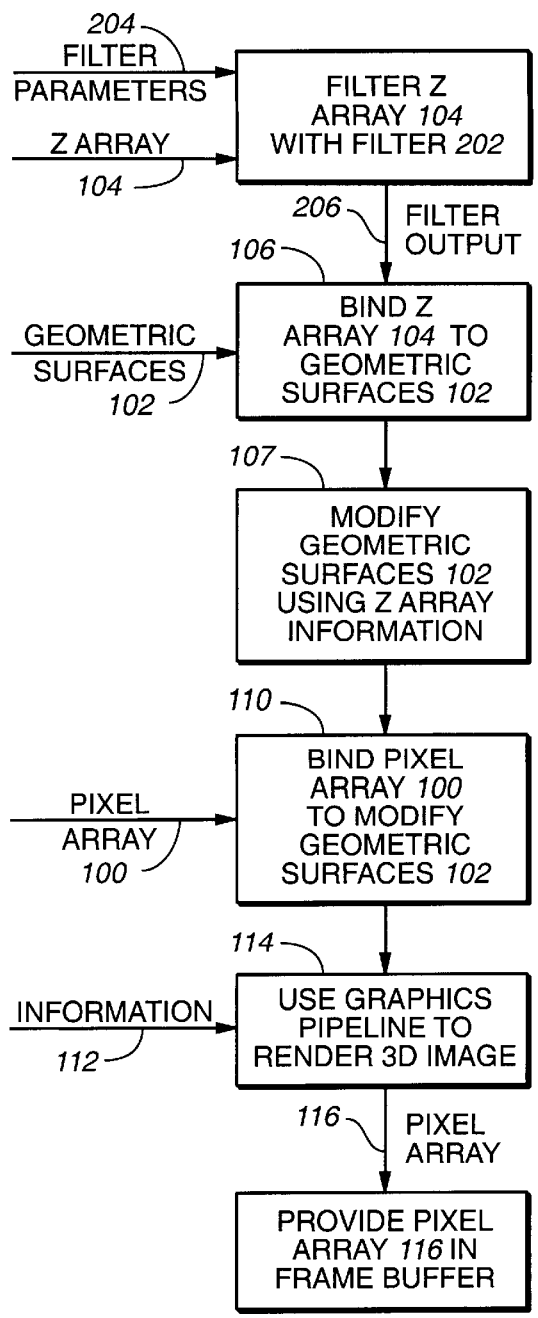
FIG._5
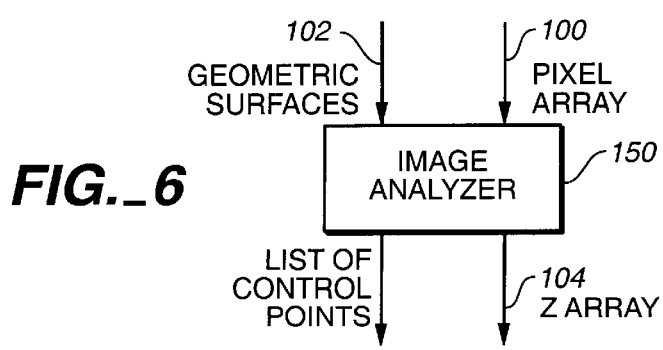
FIG._6

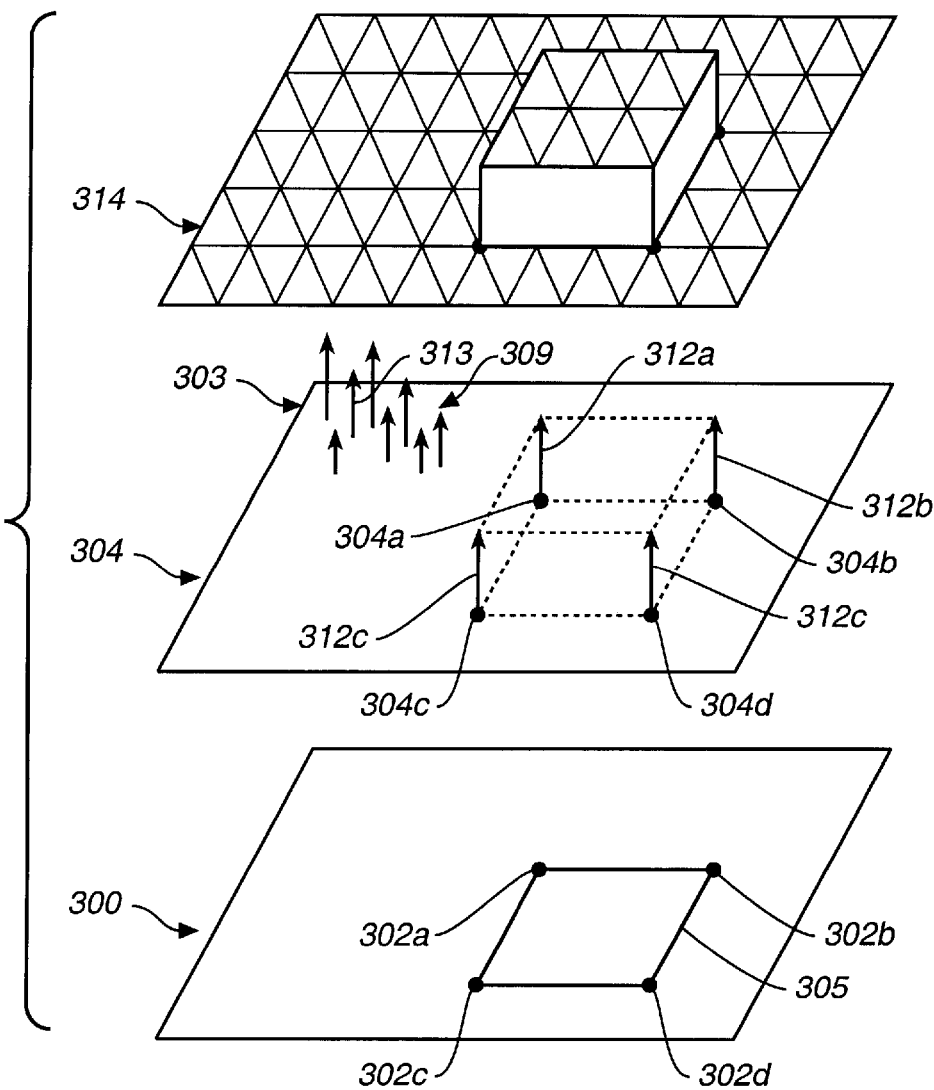
FIG._7

METHOD AND APPARATUS FOR 3D MODEL CREATION BASED ON 2D IMAGES

This patent claims priority based on U.S. Provisional Patent Application Serial No. 60/118,508, filed Feb. 3, 1999, incorporated herein by reference.

BACKGROUND OF THE INVENTION

This invention pertains to 3D object construction. In particular, this invention pertains to integrated texture mapping, filtering and image geometry displacement.

It is known in the art to computer generate 3D objects, texture them, and project them as a sequence of images on a screen. One way of doing this is with a conventional 3D graphics pipeline. Briefly, a conventional 3D graphics pipeline creates an image by performing the following tasks:

1. A computer model of a geometric surface is created or provided. The computer model can be an array of polygons, described in the computer model in terms of the x, y and z coordinates of its vertices. The polygons are joined together at their edges to form a 3D surface. Alternatively, the computer model can be a set of geometric surfaces that are defined in other ways, e.g. "implicitly defined," using mathematical equations.
2. A pixel array (or arrays) containing one or more images to be applied to the polygons (or implicitly defined geometric surfaces) as textures is provided. We will refer to this type of pixel array as a "texel" array. We will refer to the individual pixels within the texel array as texels.
3. The texel array is "bound" to the polygons or surfaces. In other words, each polygon is associated with a portion of the texel array that contains a description of the appearance (e.g. color, brightness, saturation, a pattern of colors, etc.) that polygon will exhibit.
4. A 3D graphics pipeline then uses the texel array and computer model of the surface to generate an image. This image is provided as another pixel array that is displayed on a computer monitor or other output device.

While the above-mentioned process is adequate for some purposes, this process is has some shortcomings when one tries to apply certain textures to the computer model of the surface. For example, assume that instead of applying a simple texture contained in a texel array to an object, one tries to apply a pixel array that is a photograph of an object (e.g. a book on a table). The book is, of course, a three-dimensional object. If one simply uses a 3D graphics pipeline to apply such a pixel array to the computer model of the surface, the result will be a surface having a 2D image of a book thereon. In other words, the 3D characteristics of the book will be lost. It would be desirable to preserve the 3D characteristics of 3D objects depicted in a 2D pixel array when applying the pixel array to a computer model of a geometric surface. This would result in the construction of more realistic images to be displayed on a CRT.

SUMMARY

A method in accordance with our invention comprises:
a) providing a computer model of a surface;
b) providing a 2D image in the form of a pixel array;
c) providing additional intrinsic information about the 3D characteristics of the 2D image;
d) binding the pixel array to the computer model of the surface; and
e) offsetting the surface within the computer model as a function of additional intrinsic information.

In one embodiment, the surface of the computer model is offset in the Z direction.

In one embodiment, the pixel array contains a representation of a three dimensional object. For example, suppose the pixel array contains a representation of a book on a table. Books have a certain thickness. The computer model of the geometric surface is modified in accordance with above-mentioned additional intrinsic information pertaining to the 3D characteristics of the book. Accordingly, the portion of the geometric surface where the book is to be rendered will appear displaced relative to the rest of the geometric surface. This creates a "3D" appearance for the book.

In one embodiment, the pixel array and modified computer model of the geometric surface are rendered into an image using a 3D graphics pipeline. The 3D graphics pipeline typically receives as inputs information concerning the location and orientation of the geometric surface in a "world coordinate system." The 3D graphics pipeline also receives as inputs information concerning where a "virtual observer" is to observe the object being rendered, and where a "virtual lighting source" is to illuminate the object. The 3D graphics pipeline takes this information and generates a second pixel array corresponding to an image that is to appear on a computer display device such as a CRT. As the orientation of the geometric surface is modified by the 3D graphics pipeline, the 3D characteristics of the pixel array mapped onto the surface are preserved because the computer model of the geometric surface has been modified in accordance with those 3D characteristics. Thus, the resulting image generated by the pipeline will be more realistic.

BRIEF DESCRIPTION OF THE DRAWINGS

FIGS. 1A to 1E illustrate the operation of a 3D graphics pipeline.

FIGS. 2A and 2B illustrate manipulation of a 2D image.

FIG. 3 is a simplified block diagram of a personal computer (PC) coupled to a graphics controller with a 3D graphics pipeline.

FIG. 4 is a flow diagram of an improved method for generating 3D images from a 2D pixel array of data.

FIG. 5 is a flow diagram of an embodiment of the invention using a filter for processing Z displacement values.

FIG. 6 is a flow diagram of a portion of an embodiment of the invention using an image analyzer for generating Z displacement values.

FIG. 7 illustrates the manner in which an image filter is used to generate displacement coefficient values.

DETAILED DESCRIPTION

As mentioned above, a method in accordance with our invention involves modifying a computer model of a surface to offset portions of the surface in the Z direction as a function of information contained in a pixel array, and then using the modified computer model and pixel array to generate a more realistic 3D image. Rendering the 3D image typically involves the use of a 3D graphics pipeline. Accordingly, we will first explain how a 3D graphics pipeline is normally used. Thereafter, we will describe its use during a method in accordance with our invention.

3D Graphics Pipelines

The 3D graphics pipeline referred to in this patent is a convention graphics pipeline well known in industry, e.g. as described in Foley, et al., "Computer Graphics—Principles and Practice", published by Addison Wesley in 1997. The graphics pipeline can be implemented by a combination of hardware elements, known as accelerators, and software, some of which is sometimes referred to as drivers. The partitioning between hardware and software may vary, depending upon the CPU used and the graphics card in the system, but the overall system performs the method described below. Portions of the pipeline tasks can be performed by software, which is less expensive than hardware, but in general slower than hardware solutions at the present time. The hardware and software that perform the method described below are referred to simply as a pipeline, without regard to the specific partitioning.

The following is a simplified, general description of 3D graphics pipelines. It is not intended to described any specific product (e.g. products mentioned later in this patent). Rather, the following description is merely a general explanation of 3D graphics pipelines to assist the reader's understanding.

Currently, graphics objects created using a 3D graphics pipeline can be described as a set of geometric surfaces. One way of constructing a geometric surface in a graphics pipeline is to create a "mesh" of "primitives." A "primitive" is a small geometric surface that can be defined by a set of vertices. For example, the primitive can be a polygon (e.g. a triangle or quadrilateral) defined within the pipeline in terms of the locations (in x, y and z coordinate space) of its corners or vertices. A set of several primitives is used to define a larger 3D surface.

Instead of using primitives, such as polygons, some graphics pipelines can process geometric surface areas defined in other ways, e.g. by mathematical equations. This technique for defining geometric surface areas is called "implicit." As explained below, both techniques for defining such surface areas can be used to perform a method in accordance with our invention.

For purposes of clarity of explanation, we will first describe a graphics pipeline that processes geometric surface areas using triangular primitives. We will discuss other types of graphics pipelines later on.

In this first example, a 3D graphics pipeline constructs a 3D image of an object from a 2D texel array (typically called a "texture map"). FIG. 1A illustrates a 2D image 2 of a set of "textures." (As will be explained below, this texture map is used to create the image of an object—in this case, a house. Image 2 includes a portion 2a, which has the appearance of bricks, portion 2b, which has the appearance of roof shingles, portion 2c, which has the appearance of a door, and portion 2d which has the appearance of a window.) 2D image 2 is stored in a digital memory in the form of an array of texels. Each location in the memory stores a texel, which is one or more words of data indicating the color, color saturation and brightness corresponding to that texel. The location of the texels within the array is typically referred to as u, v coordinates (not to be confused with the Y, U and V signal names used to describe certain video signals). The u, v coordinates are similar to x, y coordinates of the Cartesian coordinate system. In FIG. 1A, the texel array is an n by m array, where n and m are integers.

As mentioned above, FIG. 1A represents a texel array. Physically, the array comprises data loaded into a memory.

The next step in the process is to provide or prepare a geometric surface. In this example, the geometric surface is in the form of a mesh 4 of primitives 5 in three dimensional space (FIG. 1B). In the case of FIG. 1B, the primitives are triangles, but other types of polygons can be used. The mesh of primitives represents a three-dimensional shape of an object O in 3D space (in the case of FIG. 1B, the shape of a house). The position of each vertex of each triangle within mesh 4 is stored in a memory in the form of x, y and z Cartesian coordinates, relative to the object. These coordinates are sometimes referred to as model coordinates ("MC"). The process of preparing such a mesh is well-known, and described in standard graphics libraries, such as Real 3D, published by Real 3D, a Lockheed Martin Corporation, in 1996, and Direct 3D, published by New Riders Publishing in 1997.

The mesh of FIG. 1B is not displayed as such. Rather, the mesh of FIG. 1B is a representation of what is stored in a digital memory. Specifically, the memory stores the locations, in terms of x, y and z coordinates, of each vertex within mesh 4.

The next step is to map or "bind" the two-dimensional texture map of FIG. 1A onto mesh 4 of FIG. 1B. This is accomplished by mapping each triangle vertex to a location in the texture map. In effect, a list of data points is prepared that associates each vertex of mesh 4 to the u, v coordinates of a particular point (texel) in the texture map of FIG. 1A. (The locations in the texture map to which the vertices are bound are sometimes referred to as "control points.")

This portion of the process is roughly analogous to an upholsterer choosing a piece of fabric, and binding it with a few nails to the corner of a couch being upholstered (the nails are like control points). The upholsterer subsequently asks his apprentice to finish attaching the fabric to the couch. In this case, the 3D graphics pipeline finishes the task instead of an apprentice.

FIGS. 1A and 1B describe the process by which one texture map (FIG. 1A) is mapped onto one mesh 4 representing one object O. A graphics pipeline can, and often does, map one or several texture maps onto the same or several different objects.

The next step in the process is to set up a "world coordinate model" of the various objects to be displayed. This requires establishing a position and directional orientation for each object to be displayed. For example, supposing that instead of a house there are to be two objects to be viewed: a tetrahedron T and a cube C (FIG. 1C). During this portion of the process the pipeline is instructed that cube C is to be facing in a certain direction, and is to be located partially in front of tetrahedron T relative to a certain frame of reference. Again, the structure of FIG. 1C is not displayed per se. Rather, the graphics pipeline sets up processing of the model coordinates in accordance with the parameters of the position and orientation of the object.

The next step is to select a frame of reference. For example, it might be decided that the "viewer" will want to observe the objects from a position corresponding to a corner of the world coordinate model (e.g. position P in FIG. 1D). Thus, a virtual viewpoint, viewing direction and aperture will be selected. The parameters associated with this "viewer" define the screen coordinate (SC) system. Further, it might be decided the viewer will observe these objects with a light source located at a position L. The graphics pipeline will set up another processing pipe to process the world coordinate data into the screen coordinate data which will cause a computer screen to display the image as it would be perceived by the observer at position P (e.g. the image of FIG. 1D). In other words, the computer screen will provide an image of tetrahedron T and cube C as they would be observed by a viewer if he were standing at position P, and a light source were present at location L. This image will be provided initially as a pixel array in a frame buffer and then displayed by the computer screen. The image in the frame buffer is refreshed, i.e. regenerated according to the specifications programmed into the pipeline, typically at about 50 to 120 times per second. There are many different methods for optimizing the pipeline, and minimizing the time spent processing the invisible parts of the objects, such as the backside of cube C facing away from the viewer. Such details are well-known to those skilled in the art, and will not be discussed in detail here.

During the above-described process constructing the pixel array and providing it in the frame buffer, the pipeline a) fetches the portion of texture map 2 "tacked" to the vertices of mesh 4 (and therefore stretched over each triangle); b) determines how and where that portion of the texture map should appear, given the orientation of the triangles relative to the viewer and the location of the light source; and c) constructs the appropriate bit map pixel array for storage in the frame buffer. The contents of this frame buffer are then displayed as an image on a computer screen.

Thereafter, the 3D graphics accelerator permits one to manipulate the displayed objects in any desired manner. For example, if one wants to rotate the image of tetrahedron T by 45° (FIG. 1E), the 3D graphics accelerator facilitates this manipulation. This is accomplished by providing a new set of parameters in the world coordinate model for the graphics pipeline indicating the new position and orientation for tetrahedron T. After this occurs, the next time the graphics pipeline regenerates the image stored in the frame buffer, the regenerated image will reflect this rotation of tetrahedron T.

Similarly, suppose that it is desired to display what would appear to the viewer if he took ten steps forward from his location at position P. The next time the graphics pipeline regenerates the image, it will generate and store another pixel array in the frame buffer corresponding to what would appear to such a viewer, and this pixel array is provided as another image on the computer screen.

It is thus seen that the graphics pipeline is extremely useful in applications such as video games, where it is desired to simulate what would appear to a game player if he were wandering past a set of objects.

As mentioned above, some graphics pipelines create models of geometric surfaces using an implicit technique. These surfaces are often described as a function of the position coordinates, i.e. f (x,y,z), or can also contain some vertices. Control points and additional formulas associated with such surfaces are used to bind a digital texel array (e.g. an array as shown in FIG. 1A) to the implicitly defined surface, and the process proceeds as described above. The major difference is that instead of defining surface areas in terms of primitives with vertices, the surface areas are defined in terms of mathematical equations.

Manipulation of 2D Images

Our previous U.S. patent application Ser. No. 09/344,442 (incorporated herein by reference) discloses a method of applying a 2D image onto a geometric surface. A method in accordance with this application begins with the step of obtaining a two-dimensional digital image (e.g. image 10 in FIG. 2A). This step can be performed, e.g., by scanning an image such as a photograph or other picture using a conventional digital scanner. The digital image can also be obtained from a conventional digital camera. The image can also consist of digital video image, e.g. out of a live or stored video stream, which is basically a fast succession of 2D images. However, any other source of a 2D digital image can be used. As mentioned above, the digital image is typically stored in a memory as an array of digital values. In one embodiment, the digital values are in a compressed form, e.g. using a compression technique such as MPEG1 or MPEG2 or other formats. In the case of compressed digital values, they must first be decompressed prior to processing. Also, scanned images or digitized images from any source such as cable TV, an antennas, cameras, etc. can be used.

As mentioned above, for the case of video images, dozens of frames per second comprising millions of pixels per second must be processed. Standard graphics pipelines can be used to process frames of data sufficiently fast to process video images.

Any type of memory can be used to store the digital 2D image, e.g. semiconductor memories (SRAMs, DRAMs or other semiconductor memories), a magnetic memory (e.g. a hard disk, a floppy disk, magnetic tape, or magneto-optic disk), or other type of memory device (e.g. an optical disk). The pixels corresponding to the stored image can be stored in terms of RGB values (e.g. the strength of the red, green and blue components of the pixel color), YUV values or other values. (For YUV values, Y corresponds to the amplitude or brightness of the pixel value, U corresponds to the color and V corresponds to the saturation.) The pixel values can be encoded in other ways as well. Depending on the situation, a conversion may be required before further processing.

Next, a 3D graphics pipeline is set up. This is accomplished by providing instructions to the 3D graphics pipeline as to what is to be done with the data that is to be provided. Setting up graphics pipelines per se is well known in the art, e.g. as described in the Microsoft Direct 3D SDK (software developer kit) or Direct 3D.

Thereafter, a computer model of a planar geometric surface is generated. This computer model can comprise a set of primitives, e.g. polygons such as triangles. In another embodiment, the computer model can comprise an implicit description of a flat geometric surface. This implicit description is typically a mathematical function (e.g. a function of x, y and z) as described above.

For the case in which the planar geometric surface comprises a mesh of primitives, the number and shape of primitives and the type of primitives can vary. FIG. 2B illustrates a mesh 12 that can be used to practice a method in accordance with our invention. Mesh 12 is similar to mesh 4 described above. However, unlike mesh 4, all of the vertices of mesh 12 are coplanar (or substantially coplanar). In one embodiment, mesh 12 comprises about 5000 triangles, which would be acceptable for processing a video image. Of course, other numbers of primitives could be used.

After constructing the planar geometric surface (e.g. mesh 12), image 10 is mapped, or bound, onto the flat geometric surface. This is accomplished in the following way. For the case in which the flat geometric surface is a mesh such as mesh 12, each vertex of the flat geometric surface (e.g. the triangle vertices) is associated with an image pixel location (i.e. control point). Thus, each control point is associated with a texture coordinates (u, v) corresponding to a pixel. A table of data listing each vertex and its associated u, v texture space coordinates is set up. This is called "binding." (See Kamen, IEEE Computer Society, IEEE Computer Graphics and Applications, January–February 1997, Vol. 17, No. 1.) For the case in which an implicit technique is used to define the flat geometric surface, control points within the implicitly defined surface are bound to pixel array coordinate space (u, v coordinates) in a manner analogous to the triangles discussed above.

After image 10 is mapped into mesh 12, the object can be manipulated by manipulating the world coordinates. The world coordinates describe where in the x, y, z space the textured plane is to appear, and what its orientation will be (i.e. what angle it should be held at with respect to the viewer). In addition, the screen coordinates for the object can be changed. As a result, when the 2D textured image is finally prepared, it can be prepared in a manner that reflects the desired manipulation. For example, it can be rotated about any axis, magnified, shrunk, etc.

After establishment of the world coordinate model and screen coordinate model, the pipeline prepares an array of pixels in the output frame buffer (OFB), including pixels showing the manipulated textured mesh 12. The array of pixels in the OFB is displayed on a CRT or other type of screen.

One can manipulate the video image by, for example, changing the world coordinate parameters, e.g. telling the pipeline to tilt the video image about any axis (including an axis perpendicular to the screen or in the plane of the screen). Thus, when the pipeline regenerates the pixel array in the OFB, the regenerated video image will appear tilted about the selected axis. Since the pipeline will regenerate the image at a preprogrammed rate according to the system used, live video will appear as live video. That is because every time a new pixel array is generated, the texture map, which contains the incoming video frame buffer, is reread and put through the pipeline. Since the texture mapping process also contains features for pixel interpolation, an automatic resolution adaptation occurs.

One can bend or warp the image by moving the vertices about which the image is mapped. Thus, one can alter the flat geometric plane of FIG. 2B to thereby warp the image. When the pipeline regenerates the pixel array in the frame buffer, the image will appear warped.

One can move the vertices so that mesh 10 becomes a cylinder. When the pipeline regenerates the pixel array in the frame buffer, the image will appear wrapped around a cylinder. (Of course, the mesh 10 can be altered into other shapes, and the image would be wrapped around the other shape.) These modifications can be done at a speed that creates the impression in the viewer that the image is being wrapped or warped gradually.

One can magnify or shrink images by moving vertices away from or closer to each other, or moving the image closer or further from the viewer in the world coordinate system, or by re-parameterizing the model coordinate to world coordinate conversion.

One can cause the image to "melt" by causing the verticies to drop at different rates.

The number of 3D manipulations possible is only limited by the energy of a user to try them all out.

Hardware and Software for Practicing an Embodiment of a Method in Accordance With Our Invention One embodiment of our invention can be practiced using a PC having the following:
1. A CPU such as a Celeron or Pentium, e.g. as manufactured by Intel, or a K6 processor, e.g. as manufactured by Advanced Micro Devices.
2. 32 MB of memory or greater.
3. A 3D HW adapter. This is a type of graphics card currently available on the market. The 3D HW adapter should have 4 MB of memory (preferably 8 MB) and an advanced graphics port (AGP) interface. (An AGP interface is a type of bus standard that is well-known in the art.) Alternatively, a peripheral connection interface ("PCI") can be used in lieu of a AGP. The PCI is a type of bus standard that is well known in the art. Examples of appropriate 3D HW adapters include the TNT-2 available from Riva, the ATI Rage 128, the Matrox G400, the Trident Blade 3D and the S3 Savage.
4. The operating system can be Windows 95, Windows 98, Win2000, or any other operating system that supports direct 3D. The Windows operating system includes a standardized platform called Direct X for Windows.

In one embodiment, a user sets up the flat geometric surface (for example, a triangle mesh) in the Direct 3D windows environment. The set of instructions is then provided to the graphics pipeline, which finishes the rendering process. However, in another embodiment, the PC comprises a bypass mechanism that permits one to access the hardware accelerator directly using a software interface provided by the graphics card manufacturer.

FIG. 3 is a block diagram of a computer system 50 for performing a method in accordance with our invention. Referring to FIG. 3, system 50 comprises a CPU 52, e.g. a Pentium II class CPU, comprising a cache memory 52$a$, a core 52$b$ and an internal bus 52$c$ for facilitating communication between core 52$b$ and cache 52$a$. Core 52$b$ communicates via a CPU bus 54 to a system controller 56. System controller 56 communicates with the system memory 58 via a memory bus 60. System memory 58 includes a first portion 58$a$ which stores system memory programs and a second portion 58$b$ that stores the texture maps such as described above.

Also included in system 50 is a PCI bus 62 for facilitating communication between system controller 56 and I/O devices 64, 66 and disk drive 68. I/O device 64 can be any type of I/O crevice. In one embodiment, I/O device 66 is a video capture card with a driver. Data from the video capture card is either loaded by DMA (direct memory access) or CPU 52 into a frame buffer, typically within main memory 58. However, the frame buffer may be in other memories within system 50.

System 50 also includes an AGP graphics controller 70 comprising a 3D accelerator. In one embodiment, AGP graphics controller 70 communicates with system controller 56 via an AGP bus 72. In an alternative embodiment, AGP graphics controller 70 can communicate with system controller 56 via PCI bus 62 (e.g. as shown in phantom in FIG. 3).

Graphics controller 70 uses its own local memory 74 to generate and store pixel arrays to be displayed on a video display unit 76.

It is emphasized that system 50 is only one example of a system that performs a method in accordance with our invention. Other hardware can be used as well.

First Embodiment of 3D Model Creation Based on a 2D Image

Referring to FIG. 4, a method in accordance with the present invention for creating a 3D model based on a 2D image begins with the step of providing a 2D image in the form of an array of pixels 100 and a set of geometric surfaces 102. The geometric surfaces can be a grid of polygons or they can be implicitly defined. As will be explained in greater detail below, it would be desirable, but not necessary, to have an established relationship between the grid of polygons and the 2D image. (In other words, it would be desirable to have a pattern in the polygons that matches the 2D image to facilitate binding the pixels to the polygons.) Array of pixels 100 can be provided from any appropriate source, e.g. as described above and in our '442 application.

Together with the 2D image (or array of pixels 100) additional information about image-related "intrinsic" 3D geometry is provided. For instance, this information can be the luminance of the image, its hue, saturation, or an external "depth map" which describe pixels' distance from eye point in a normalized form. As described in greater detail below, this additional information is used to modify geometric surfaces 102 so that the geometric surfaces reflect the 3D aspects of the image depicted in pixel array 100. This additional information is hereafter referred to as a "Z array" 104. Z array 104 may have a size or resolution that is different from pixel array 100. Z array 104 comprises data in an x, y coordinate system. The data within Z array 104 is hereafter referred to as a "displacement coefficient." Z array 104 can be stored in the same type of memory devices as pixel array 100.

Z array 104 is bound to geometric surfaces 102 (step 106 of FIG. 4). This is done in a manner similar to the binding of a prior art texel array to a geometric surface. Thus, each vertex within geometric surface 102 is associated with a location (in terms of x, y coordinates) within Z array 104.

If a Z array data location bound to a vertex of geometric surface 102 is a control point, then the displacement coefficient corresponding to that Z array location is assigned to that vertex. That vertex's Z coordinate is then displaced by a distance that is proportional to the displacement coefficient. In other words, the vertex's coordinates are modified, and the vertex is moved in the Z direction by a distance proportional to the displacement coefficient. This typically occurs within the graphics pipeline, although it can also be done by CPU 52.

If the Z array location bound to a vertex of geometric surface 102 is not a control point then the Z position for that vertex is interpolated as a weighted sum of the values of its neighbor control points. In other words, the position (in the Z direction) of each non-control point vertex is recalculated by interpolation as a function of the surrounding control point Z positions. Edges can be handled by mirroring, banding, or wrap-around techniques. If there are no control points, the vertex is simply offset in accordance with the Z array value for the location bound to that vertex.

Thereafter, pixel array 100 is bound to modified geometric surface 102 in a manner similar to the manner in which conventional texel arrays are bound to a geometric surface (step 110 in FIG. 4).

Thereafter, the parameters for the 3D graphics pipeline are established. For example, information 112 is provided corresponding to how the modified geometric surface is to be positioned in the world coordinate system, the location of a virtual viewer, and a location for a virtual lighting source. A 3D graphics pipeline takes this information and uses it to render an image (step 114 of FIG. 4) and provide that image in the form of a pixel array 116 in a frame buffer. The contents of the frame buffer are then displayed on a device such as a CRT.

Second Embodiment Including Image Filter 202

In one embodiment, Z array 104 is smoothed or otherwise modified by a filter 202 before geometric surface 102 is modified (FIG. 5). In this embodiment, image filter 202 receives as inputs Z array 104 and a set of filter parameters 204, and provides in response thereto filter output array 206. Instead of using Z array 104 to modify the Z coordinates of geometric surface 102, in this embodiment filter output array 206 is used to modify the Z coordinates of geometric surface 102. The filter parameters include a) aperture size, b) aperture center, c) aperture form, and d) aggregation scheme. The image filter essentially applies a mathematical function that takes as its inputs the data within Z array 104 and provides an output value for each data point within the array.

Merely by way of an example, one type of filter might have an aperture that includes each Z data point surrounding the aperture center. Filter 202 analyzes each data point within Z array 104 in sequence. For each Z data point being analyzed, the input values on which the image filter operates include all of the Z data points within the filter aperture. For example, suppose that a) the filter is analyzing the Z data point at coordinate 10, 10; and b) the filter's aperture includes all of the Z data points surrounding the Z data point at coordinate 10, 10. Thus, the image filter takes as inputs the eight Z data points surrounding Z data point 10, 10 (i.e. the data points at coordinates 9, 9; 9, 10; 9, 11; 10, 9; 10, 11; 11, 19; 11, 10; and 11, 11). The image filter thus has an aperture that causes the filter to evaluate eight data points. The term "aperture form" refers to the shape of the aperture. In this example, the aperture form is a square containing the eight Z data points surrounding the aperture center.

The aggregation scheme of the filter is the mathematical function or formula by which the filter takes all of the values corresponding to the data points within the aperture and generates a single number as the filter output. One example of a filter simply calculates an average of the values of the eight above-mentioned data points. The filter then calculates a normalized value corresponding to this average. The normalized value is between zero and one, where one is the maximum possible average intensity, and zero is the minimum possible average intensity.

For the case of data points located at the edges of Z array 104, the filter can calculate its output array 206 by mirroring, banding or wrap-around techniques. (Mirroring merely means that the displacement coefficient for data points at an edge of the array are calculated by assuming that any locations within the filter aperture but outside the Z array boundary are the mirror image of the data points inside that boundary. Wrap-around means that the filter assumes that any locations within the filter aperture to the left of the Z array boundary equal the values at the far right edge of the Z array. Similarly, any locations within the filter aperture above the top array boundary are treated as equaling the values at the very bottom of the array. Banding assumes that any values within the aperture past an edge of the array have values identical to the column of data points immediately adjacent that edge. In one embodiment, a Bartlett filter is used for performing this function.)

Generation of Z array 104

Image array 100 and Z array 104 can be generated using any of a number of techniques. In one embodiment, image array 100 and Z array 104 can be provided using cameras. The camera used to generate Z array 104 processes information such as luminance, and the Z array data is based on the output of that camera.

In another embodiment, Z array 104 can be provided by an image analyzer 150 (FIG. 6). Image analyzer 150 performs two functions. First, analyzer 150 selects the Z array 104 values from a set of possible sources or generates the Z array 104 values using an algorithm, e.g. as described below. Second, analyzer 150 selects the control points within 2D pixel array 100. Image analyzer 150 is either controlled interactively by a human operator or non-interactively in accordance with a pre-defined algorithm. Three examples of image analyzers are described below:

Image Analyzer

EXAMPLE 1

In this example, 3D information in Z array 104 is a function of luminance information contained within image pixel array 100. Geometric surface 102 is a flat geometric surface comprising a uniform grid of 50 by 50 triangles. The position of each vertex within this grid is matched with a corresponding location of a pixel within array 100 based on the geographic location of the vertex within the grid and the location of the pixel within array 100. The pixels within array 100 that are matched with each vertex constitute control points.

Image Analyzer

EXAMPLE 2

3D information is completely described in a gray scale image (depth map) which has the same size as an original image. (The gray scale image is made using a camera equipped with depth perception.) The control points are chosen using the technique described for Example 1 above.

Image Analyzer

EXAMPLE 3

The data within Z array 104 is computed as an arithmetic mean of all red and green color values for each pixel within array 100. Control points are chosen using the method described in Example 1.

Other image analyzers are well-known in the art. Examples of appropriate image analyzers include outline filters, contrast filters and functional derivatives of the original image or a second, user supplied image. For the case in which image analyzer 150 generates Z array 104 as a function of pixel array 100, the image analyzer function (as well as the filter 202 function) can be performed by CPU 52. CPU instructions pertaining to the image analyzer function can be present in disk 68 or other mass storage device. Alternatively, the image analyzer function can be implemented with a dedicated hardware accelerator or a combination of hardware and software.

FIG. 7 shows an example of a method in accordance with the present invention. A 2D image 300 and a Z array 304 corresponding to an object 305 (a square) is provided. Z array 304 includes control points 304a to 304d. In corner area 303, a vector forest (i.e. a forest of vectors, each vector corresponding to a displacement coefficient for a given location within Z array 304) is shown, that would occur for "natural data images", such as photographs. (In other words, for certain types of images, such as images that might be contained in a photograph, the displacement coefficient might vary from one pixel to its neighbors.) However, most vectors are very similar, e.g. grass in the background of a picture has many features, but is over all seen as "only" a texture. Hence an average texture vector 313 corresponding to the average of the displacement coefficients in a region of the pixel array can represent the vector forest. (The vectors associated with pixels in the rest of the image are not shown, to avoid obscuring the drawing.) Lines 309 are shown in FIG. 7 to help visualize the manner in which the polygons are displaced, and do not exist in the image being rendered.

Returning now to object 305, its points 302a to 302d are bound to control points which are displaced in accordance with vectors 312a to 312d, making object 315 (image of 305) a raised object in 3D, hence adding the third dimension based the data in Z array 104. (As mentioned above, the data within Z array 104 can be a function of color, texture, or other parameters of pixel array 100.) This is accomplished by modifying geometric mesh 314 as shown in FIG. 7. When rendered as an image, square 305 will be raised in the z direction.

It will be appreciated that modifying the position of the control points in the Z direction will cause the image being rendered to be more realistic. It is often the case that a change in color in a photographic image corresponds to an object having a certain thickness. By modifying the control points in the Z direction in accordance with that change of color, the resulting mesh of polygons will more accurately match the object whose image is being rendered. If the 3D graphics pipeline is called upon to prepare an image of that object from a different angle, that Z direction displacement will be preserved, and more accurate images of the object can be prepared.

The image filter may not always displace the colored object in the Z direction by an appropriate amount. For example, an object with a colored concave section may be inadvertently portrayed as a convex object, or vice versa. Accordingly, in some embodiments, a human operator may monitor or modify the manner in which the image is being modified in order to ensure that the image is being adjusted properly.

After the geometric adjustment of the object, an image is rendered using a 3D graphics pipeline, which prepares a pixel array in a frame buffer memory corresponding to the image. The image stored in the frame buffer memory is then displayed by a device such as CRT.

APPLICATIONS FOR THE INVENTION

There are many applications for our invention. One application is to render 2D images into 3D objects:, without requiring prior construction of a correct geometric surface, which can be an arduous task. Rather, one skilled in this art, using the present invention, can simply select a few control points, and use the Z array to handle the rest. In case of a house, or a simplified cube, he or she would choose exterior boundary points, such as the corners on top of the house, or on the roof, and based on the color differences and other aspects, such as brightness, etc., the Z array would used to raise the house from the surrounding land, much like a laborious process of making a geometric surface would do. Then the 2D image is bound and "stretched" onto that geometric surface, thereby generating a 3D representation of a house, from a 2D image, using very few (if any) manual steps, and using a 3D pipeline in a novel manner.

While the invention has been described with respect to a specific embodiment, those skilled in the art will realize that changes can be made in form and detail without departing from the spirit or scope of the invention. For example, instead of moving the geometric surface in the Z direction, one can move the geometric surface in another direction. Accordingly, all such changes come within the invention.

We claim:

1. A method for forming an image comprising the acts of:
   providing an array of pixels representing an input image;
   providing a computer model of a geometric surface;
   providing displacement information, said displacement information being derived from said input image, said input image being the only input image used to generate said displacement information;
   modifying the position of said geometric surface as a function of said displacement information;
   binding said geometric surface to said array of pixels; and
   rendering an output image based on said array of pixels and said modified geometric surface,
   wherein a contrast filter is applied to said pixels for detecting contrasts in portions of the image depicted by said pixels.

2. A method for forming an image comprising the acts of:
   providing an array of pixels representing an input image;
   providing a computer model of a geometric surface;
   providing displacement information, said displacement information being derived from said input image, said input image being the only input image used to generate said displacement information;

modifying the position of said geometric surface as a function of said displacement information;

binding said geometric surface to said array of pixels; and rendering an output image based on said array of pixels and said modified geometric surface, wherein an outline filter is applied to said pixels for detecting the outline of one or more objects depicted by said pixels.

3. A method for forming an image comprising the acts of:

providing an array of pixels representing an input image;

providing a computer model of a geometric surface;

providing displacement information, said displacement information being derived from said input image, said input image being the only input image used to generate said displacement information;

modifying the position of said geometric surface as a function of said displacement information;

binding said geometric surface to said array of pixels; and rendering an output image based on said array of pixels and said modified geometric surface, wherein said displacement information is in the form of a displacement array, said method further comprising smoothing the displacement information in said displacement array by filtering said array, and wherein said filter performs banding.

4. A method for forming an image comprising the acts of:

providing an array of pixels representing an input image;

providing a computer model of a geometric surface;

providing displacement information, said displacement information being derived from said input image, said input image being the only input image used to generate said displacement information;

modifying the position of said geometric surface as a function of said displacement information;

binding said geometric surface to said array of pixels; and rendering an output image based on said array of pixels and said modified geometric surface, wherein said displacement information is in the form of a displacement array, said method further comprising smoothing the displacement information in said displacement array by filtering said array, and wherein said filter uses a wrap-around technique.

5. A method for forming an image comprising the acts of:

providing an array of pixels representing an input image;

providing a computer model of a geometric surface;

providing displacement information, said displacement information being derived from said input image, said input image being the only input image used to generate said displacement information;

modifying the position of said geometric surface as a function of said displacement information;

binding said geometric surface to said away of pixels; and rendering an output image based on said array of pixels and said modified geometric surface, wherein said displacement information is in the form of a displacement array, said method further comprising smoothing the displacement information in said displacement array by filtering said array, and wherein said filter is a Bartlett filter.

* * * * *